US006581534B2

(12) United States Patent
Meyer

(10) Patent No.: US 6,581,534 B2
(45) Date of Patent: Jun. 24, 2003

(54) PNEUMATIC AGRICULTURAL PARTICULATE MATERIAL DELIVERY SYSTEM

(75) Inventor: Bradley J. Meyer, Davenport, IA (US)

(73) Assignee: Case, LLC, Racine, WI (US)

( * ) Notice: Subject to any disclaimer, the term of this patent is extended or adjusted under 35 U.S.C. 154(b) by 9 days.

(21) Appl. No.: 09/982,713

(22) Filed: Oct. 18, 2001

(65) Prior Publication Data

US 2002/0100400 A1 Aug. 1, 2002

Related U.S. Application Data

(62) Division of application No. 09/557,892, filed on Apr. 21, 2000, now Pat. No. 6,367,396.

(51) Int. Cl.⁷ .................................................. A01C 7/00
(52) U.S. Cl. ...................... 111/176; 406/83; 406/195; 221/278
(58) Field of Search ................................ 111/174, 176, 111/170, 200; 221/278, 211, 208; 406/106, 83, 154, 156, 155, 195; 222/205, 251, 263, 262, 284, 394

(56) References Cited

U.S. PATENT DOCUMENTS

| 933,527 A | * | 9/1909 | Brown ........................ 406/177 |
| 3,195,485 A | | 7/1965 | Reynolds |
| 3,964,639 A | | 6/1976 | Norris et al. |
| 3,990,662 A | | 11/1976 | Wallace |

(List continued on next page.)

OTHER PUBLICATIONS

"Air Systems, Air Seeders and Bulk Handling"; Form No. AE–173086; 1996 Case Corporation, 4 pages.
"Concord, Air Till Drill Systems", AE–170086; 1996 Case Corporation, 32 pages.

(List continued on next page.)

Primary Examiner—Victor Batson
(74) Attorney, Agent, or Firm—Rebecca Henkel

(57) ABSTRACT

A pneumatic agricultural particulate material delivery system for delivering agricultural particulate material to a growing medium is disclosed. The delivery system includes a particulate material supply chamber, a furrow opening device configured to create a furrow in the growing medium, a plurality of tubes providing an interior passage extending from the particulate material supply chamber to an outlet proximate the furrow opening device and a pneumatic pressure source pneumatically coupled to the interior passage to supply pressurized air to the interior passage to move material within the interior passage. The plurality of tubes includes an end-most material delivery tube providing the outlet. The end-most material delivery tube includes a plurality of openings extending therethrough in communication with the interior passage. In one exemplary embodiment, the plurality of openings are louvered so as to extend at a downward angle towards the outlet. In other exemplary embodiment, the furrow opening device includes at least one disk having an upper circumferential edge and a lower circumferential edge, wherein at least one of the plurality of openings extends below the upper circumferential edge.

3 Claims, 3 Drawing Sheets

U.S. PATENT DOCUMENTS

| | | | |
|---|---|---|---|
| 4,669,922 A | 6/1987 | Hooper et al. | |
| 4,899,672 A | 2/1990 | Paul | |
| 4,970,973 A | 11/1990 | Lyle et al. | |
| 5,392,722 A | 2/1995 | Snipes et al. | |
| 5,460,106 A | 10/1995 | Crockett et al. | |
| 5,481,990 A | 1/1996 | Zacharias | |
| 5,522,328 A | 6/1996 | Long | |
| 5,619,939 A | 4/1997 | Herman et al. | |
| 5,765,720 A * | 6/1998 | Stufflebeam et al. | 221/211 |
| 5,848,571 A | 12/1998 | Stufflebeam et al. | |
| 5,915,312 A | 6/1999 | Meyer et al. | |
| 6,024,208 A * | 2/2000 | Chooi et al. | 198/534 |
| 6,116,284 A | 9/2000 | Murray et al. | |
| 6,367,396 B1 * | 4/2002 | Meyer | 111/176 |

OTHER PUBLICATIONS

"Early Riser, 955 Series Cyclo Air Planters"; AE 175086; 1996 Case Corporation, 8 pages.

"Fertilizer Coulter, Model 2995/2996, Set–up and Parts Manual"; 20 pages.

* cited by examiner

PNEUMATIC AGRICULTURAL PARTICULATE MATERIAL DELIVERY SYSTEM

CROSS REFERENCE TO RELATED APPLICATIONS

The present divisional application claims priority under 35 U.S.C. §120 from U.S. patent application Ser. No. 09/557,892 by Bradley J. Meyer and entitled PNEUMATIC AGRICULTURAL PARTICULATE MATERIAL DELIVERY SYSTEM filed on Apr. 21, 2000, now U.S. Pat. No. 6,367,396, the full disclosure of which is hereby incorporated by reference.

FIELD OF THE INVENTION

The present invention relates to agricultural particulate material delivery systems for delivering and applying particulate materials, such as fertilizer, seed, insecticide or herbicide to a growing medium. In particular, the present invention relates to a pneumatic agricultural particulate material delivery system.

BACKGROUND OF THE INVENTION

Pneumatic agricultural particulate material delivery systems utilize pressurized air to assist in the delivery and movement of particulate material such as fertilizer, seed, insecticide or herbicide from a particulate material supply chamber to a growing medium such as soil. Such pneumatic agricultural particulate material delivery systems are commonly employed in planters, drills and a variety of other agricultural implements. Such pneumatic agricultural material delivery systems typically use pressurized air to move the particulate material through an interior passage provided by a series of elongate tubes which extend from the particulate material supply chamber to an outlet adjacent to the soil. The series of tubes includes an upper flexible hose or tube connected to the particulate material supply chamber and a lower seed tube connected to the upper flexible tube and supported adjacent to the soil. The lower seed tube is typically supported adjacent to a furrow opening disk and includes a funnel-shaped end through which the particulate flows and is deposited into the newly formed narrow furrow.

Although pneumatic agricultural particulate material delivery systems enable a more controlled delivery of particulate material to the growing medium, such pneumatic delivery systems are not without problems. For example, in many pneumatic delivery systems, the high velocity of the air stream causes the particulate material to bounce or to be blown out of the furrow. In an attempt to slow the velocity of the particulate material, some systems include a seed brake wherein a kinked tube having a relatively large air opening on the inner curved side of the tube above the kink is spliced between the upper tube and the lower tube.

Another problem associated with such pneumatic delivery systems is non-uniform air flow through the tube due to the soil partially occluding the outlet of the tube at various times to create back pressure. This back pressure suppresses air flow and particulate material delivery to prevent consistent delivery of particulate material to the soil. To eliminate such back pressure, some pneumatic delivery systems employ an air diffuser which is spliced between the upper tube and the lower tube above the furrow opening disk. The air diffuser typically comprises a cylindrical duct having a plurality of holes radially extending through the duct.

Even though such systems improve delivery of particulate material to the soil, such systems have several associated drawbacks. Both the seed brake systems and air diffuser systems require a specialized tube which must be spliced between the upper tube and the lower tube. As a result, both systems are more difficult to assemble. Both the seed brake and the air diffuser systems include tubes which extend well above the furrow opening disk. As a result, both systems require valuable space above the furrow opening disk. Moreover, both the seed brake and the air diffuser systems permit the escape of particulate material and particulate material dust through the opening or openings prior to the material reaching the soil. Because the openings of both the seed brake system and the air diffuser system extend above the furrow opening disk, the systems and the implement employing such systems wear at an accelerated rate due to the sometimes corrosive nature of the particulate material which is sprayed into the air above the furrow opening disk and above many of the other components of the implement.

Thus, there is a continuing need for a pneumatic agricultural particulate material delivery system which is easy to assemble and does not require additional parts, which does not require additional space, which minimizes or prevents the escape of particulate material prior to the particulate material reaching the soil, and/or which minimizes the damage caused by the escape of corrosive particulate material.

SUMMARY OF THE INVENTION

The present invention provides a pneumatic agricultural particulate material delivery system for delivering agricultural particulate material to a growing medium. The delivery system includes a particulate material supply chamber, a furrow opening device configured to create a furrow in the growing medium, a plurality of tubes providing an interior passage extending from the particulate material supply chamber to an outlet proximate the furrow opening device and a pneumatic pressure source pneumatically coupled to the interior passage to supply pressurized air to the interior passage to move material within the interior passage. The plurality of tubes includes an end-most material delivery tube providing the outlet. The end-most material delivery tube includes a plurality of openings extending therethrough in communication with the interior passage.

The present invention also provides a material placement tube for use with a pneumatic agricultural particulate material delivery system. The material placement tube includes an elongate unitary outer wall providing an interior passage extending along an axis and terminating at an outlet. The passage has an upper portion and a lower constricted portion between the upper portion and the outlet. The material placement tube further includes a plurality of louvered openings extending through the outer wall in communication with the interior passage.

The present invention also provides a pneumatic agricultural particulate material delivery system including a particulate material supply chamber, a furrow opening device, one or more tubes having at least one outer wall providing an interior passage extending from the particulate material supply chamber to an outlet, a pneumatic pressure source pneumatically coupled to one or more tubes to supply pressurized air to one or more tubes to move material within one or more tubes and a plurality of louvered openings extending through the outer wall and in communication with the interior passage. The louvered openings are downwardly angled towards the interior passage and towards the outlet.

The present invention also provides a pneumatic agricultural particulate material delivery system including a particulate material supply chamber, a furrow opening device including at least one disk having an upper circumferential edge and a lower circumferential edge, at least one tube having at least one outer wall providing an interior passage extending from the particulate material supply chamber to an outlet, a pneumatic pressure source pneumatically coupled to one or more tubes to supply pressurized air to one or more tubes to move material within one or more tubes and a plurality of openings extending through the outer wall and in communication with the interior passage, wherein at least one of the plurality of openings extends below the upper circumferential edge.

DETAILED DESCRIPTION OF THE PREFERRED EMBODIMENTS

Figure 1:
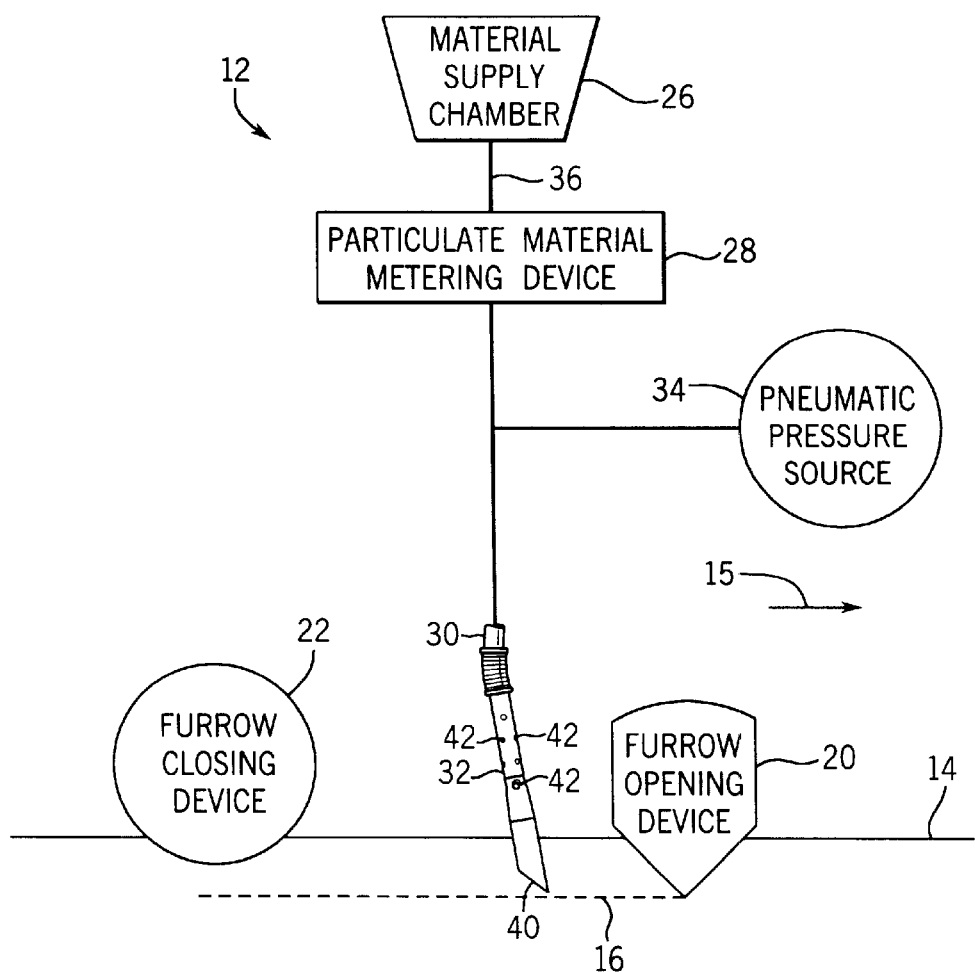
FIG. 1 is a schematic illustrating an agricultural particulate material delivery system including a material placement tube of the present invention.

FIG. 1 is a schematic view illustrating agricultural particulate material delivery system 12. Delivery system 12 delivers agricultural particulate material, such as seed, fertilizer, herbicide or insecticide to a growing medium, such as soil 14, as delivery system 12 is moved in the direction indicated by arrow 15. Delivery system 12 generally includes furrow opening device 20, particulate material supply chamber 26, particulate material metering device 28, material delivery tube 30, material placement tube 32, and pneumatic pressure source 34. Furrow opening device 20 is supported for engagement with soil 14. Furrow opening device 20 is conventionally known and is configured to create a trough or furrow 16 in soil 14 in which the particulate material is deposited. Furrow opening device 20 is comprised of any one of a variety of alternative furrow opening devices or mechanism depending upon the type of particulate material being delivered to soil 14. For example, furrow opening device 20 may comprise one or more furrow opening disks or coulters or may comprise a conventionally known shank opener or sweep.

Material supply chamber 26 comprises a chamber or volume configured to store particulate material such as seed, fertilizer, and herbicide or insecticide prior to delivery to soil 14. Particulate material supply chamber 26 may have various sizes, shapes and configurations. For example, material supply chamber 26 may comprise an interior hopper of an air drill cart such as the Concord 3400, 2400, 2300 and 1100 Air System or may comprise a bin or hopper such as employed on planters. Moreover, supply chamber 26 may be configured to hold mixtures of different kinds of particulate material or multiple products. Particulate material supply chamber 26 is coupled to particulate material metering device 28 by tube, line or passageway 36.

Particulate material metering device 28 receives particulate material from chamber 26 and meters out the particulate material to delivery tube 30 at a controlled rate. The particulate material metering device may have any of a variety of conventionally known configurations as well as locations. For example, particulate material metering device 28 may comprise a conventionally known metering flute such as employed in Concord air systems. Alternatively, metering device 28 may comprise a CYCLO air drum or a plate metering system.

Material delivery tube 30 linearly extends from metering device 28 to material placement tube 32. Material delivery tube 30 and material placement tube 32 provide an interior passage from metering device 28 to outlet 40 proximate to furrow opening device 20 and adjacent to furrow 16. The movement of the particulate material from material metering device 28 through tubes 30 and 32 is assisted by pressurized air supplied by pneumatic pressure source 34.

Pneumatic pressure source 34 is pneumatically coupled to the interior passage of tube 30, directly as shown in FIG. 1 or indirectly. In addition to assisting with the movement of particulate material through tubes 30 and 32, pneumatic pressure source 34 may also supply pressurized air to particulate material metering device 28 such as with a positive pressure CYCLO seed metering drum or such as with a negative pressure plate metering device. Pneumatic pressure source 34 preferably comprises a blower powered by a motor such as a hydraulic motor or a diesel motor. When delivery system 12 is employed with an air system cart having a hopper, pneumatic pressure source 34 also supplies pressurized air to each hopper to maintain the pressure inside the hopper or material supply chamber 26 equal to that of the air stream within tube 30.

Material placement tube 32 comprises an end-most tube connected to material delivery tube 30. Material placement tube 32 extends adjacent to furrow opening device 20 and includes outlet 40 as well as a plurality of openings 42. Openings 42 extend through tube 32 to communicate with the interior passage of tube 32 proximate to outlet 40. Openings 42 prevent back pressure within material placement tube 32 and material delivery tube 30 during occlusion of outlet 40 by soil 14. As a result, pneumatic agricultural particulate material delivery system 12 is capable of delivering particulate material to soil 14 at an increased rate. Because material placement tube 32 includes openings 42 to prevent an excessive amount of back pressure within tubes 30 and 32, delivery system 12 is also more compact since diffusion system 12 does not require an additional spliced air diffuser tube or an elongated kink tube which would otherwise occupy valuable space between the metering device 28 and tube 32. Moreover, because openings 42 extend through end-most material placement tube 32, openings 42 are closer to furrow 16 and furrow opening device 20. Preferably, openings 42 extend through end-most material placement tube 32 at locations below furrow opening device 20.

In some applications, pneumatic agricultural particulate material delivery system 12 additionally includes furrow closing device 22. Furrow closing device 22 is located on an opposite side of outlet 40 with respect to furrow opening device 20. Furrow closing device 22 is configured to engage soil 14 to move soil 14 so as to fill and close furrow 16 with soil above the deposited agricultural particulate material. Furrow opening device 20 typically comprises a pair of rotatable disks configured to engage soil 14. In such applications, openings 42 extend through tube 32 at locations below furrow opening device 20. For example, when furrow opening device 20 comprises disks, openings 42 extend below an upper circumferential edge of such disks. Because openings 42 extend through end-most tube 32 so as to be located proximate to soil 14, proximate to furrow opening device 20 and proximate to furrow closing device 22, any particulate material or particulate material dust escaping through openings 42 is released proximate to soil 14. As a result, such material or dust, which may be corrosive in nature, is less likely to become deposited upon furrow opening device 20, furrow closing device 22 or other components of the implement.

Figure 2:
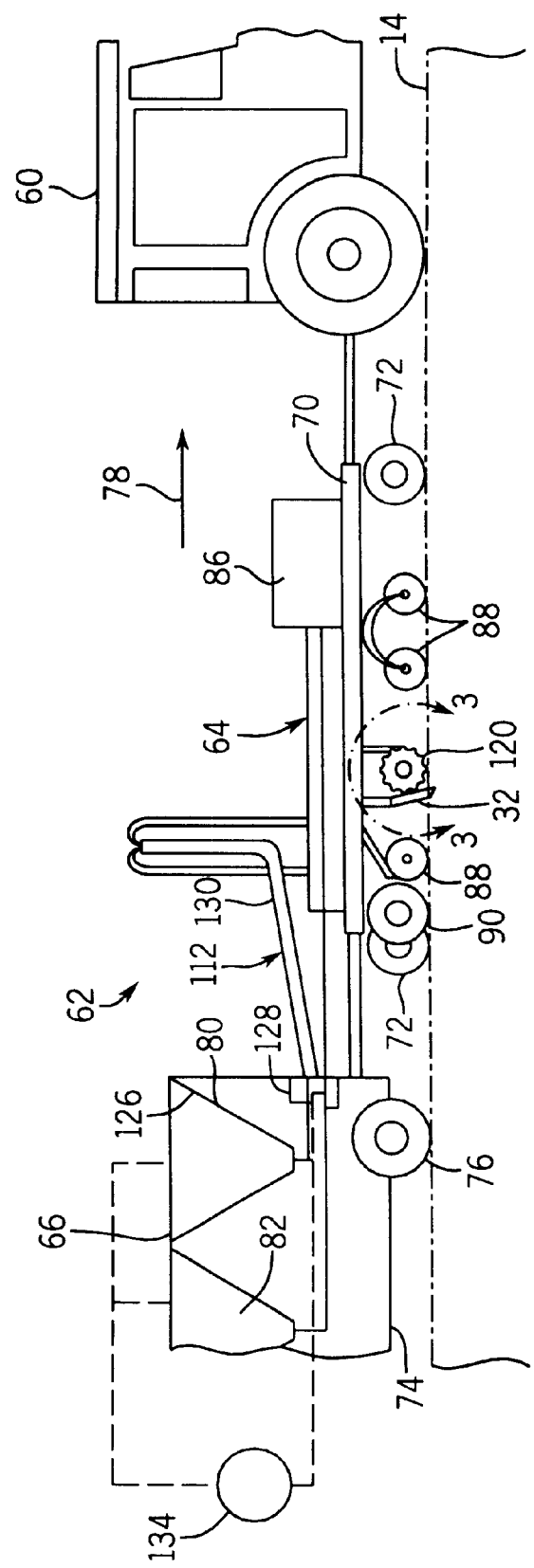
FIG. 2 is a schematic side elevational view of a tractor pulling an air till drill system including an exemplary embodiment of the agricultural particulate material delivery system of FIG. 1.
Figure 3:
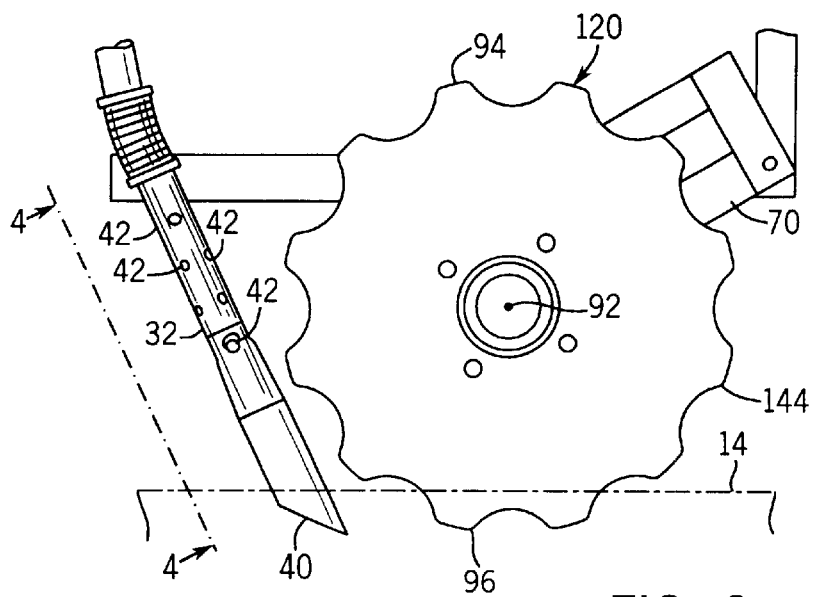
FIG. 3 is an enlarged side elevational view of the till drill system of FIG. 2 taken along line 3—3 illustrating an exemplary furrow opening device and the material placement tube of the agricultural particular material delivery system.

FIGS. 2 and 3 illustrate a tractor 60 pulling an air till drill system 62 including agricultural particulate material delivery system 112, an exemplary embodiment of agricultural particulate material delivery system 12 shown in FIG. 1. As best shown by FIG. 2, air till drill system 62 includes drill 64 and cart 66. Drill 64 includes a tool bar or frame 70 supported by wheels 72 while cart 66 comprises a main frame 74 supported by wheels 76. Drill 64 and cart 66 are each conventionally known except for material placement tube 32. Pneumatic agricultural particulate material delivery system 12 includes furrow opening device 120, material supply chamber 126, particulate material metering device 128, particulate material delivery tube 130, particulate material placement tube 32 and pneumatic pressure source 134. Each of these components of agricultural particulate material delivery system 112 is supported or provided by drill 64 or cart 66. Furrow opening device 120 comprises a furrow opening disk or coulter supported by frame 70 of drill 64 in engagement with soil 14. Material supply chamber 126 is provided by hopper 80 of cart 66. Hopper 80 supplies fertilizer or other material to particulate material metering device 128. Particulate material metering device 128 is also part of cart 66 and preferably comprises a conventionally known metering cylinder or flute. Once the material has been metered by metering device 128, the material flows through material delivery tube 130, with the assistance of pressurized air from pneumatic pressure source 34 to material placement tube 32 where the material is deposited in the furrow created by furrow opening device 120. As shown in FIG. 2, material delivery tube 130 includes multiple segments which octopus to a plurality of material placement tubes 32 positioned adjacent to a plurality of furrow opening devices 120. Cart 66 and agricultural particulate material metering device 128 are set forth and described with respect to FIGS. 1–6 in U.S. Pat. No. 5,915,312, the full disclosure of which is hereby incorporated by reference.

Although not described in detail for purposes of brevity, drill 64 and cart 66 additionally supply and deliver seed to soil 14. As a result, cart 66 is provided with a second hopper 82 which supplies particulate material, such as seed, to delivery system 84 which further delivers the seed to a CYCLO metering unit 86 supported by frame 70 of drill 64. Delivery system 84 and CYCLO metering unit 86 are illustrated and described with respect to FIGS. 9–15 in U.S. Pat. No. 5,915,312, the full disclosure of which is hereby incorporated by reference. Metering unit 86 meters the seed through tubes (not shown) to seed boots (adjacent to furrow opening devices) (not shown) for deposit within a furrow. The furrow containing the seed is then closed by furrows closing disks 88. The closed furrows are then compacted by press wheels 90. Alternatively, the seed boots may be replaced with seed placement tubes identical or configured similar to material placement tube 32.

FIG. 3 illustrates furrow opening device 120 and material placement tube 32 in greater detail. As best shown by FIG. 3, furrow opening device 120 comprises a furrow opening disk 144 supported by frame 70 in engagement with soil 14. Furrow opening disk 144 rotates about axis 92 and includes an upper circumferential edge 94 and a lower circumferential edge 96. Lower circumferential edge 96 engages soil 14 to create a furrow.

As further shown by FIG. 3, openings 42 extend through tube 32 adjacent to soil 14 and below the upper circumferential edge 94 of furrow opening disk 144. Outlet 40 extends below axis 92 and proximate to lower circumferential edge 96 of furrow opening device 20. Because openings 42 extend proximate to outlet 40 and because openings 42 further extend below upper circumferential edge 94 of furrow opening device 20, particulate material and particulate material dust escaping through openings 42 is less likely to become deposited upon frame 70 and those other components of drill 64. Since particulate material and particulate material dust can sometimes be corrosive, delivery system 12 reduces wear and damage to drill 64 and cart 66.

Figure 4:
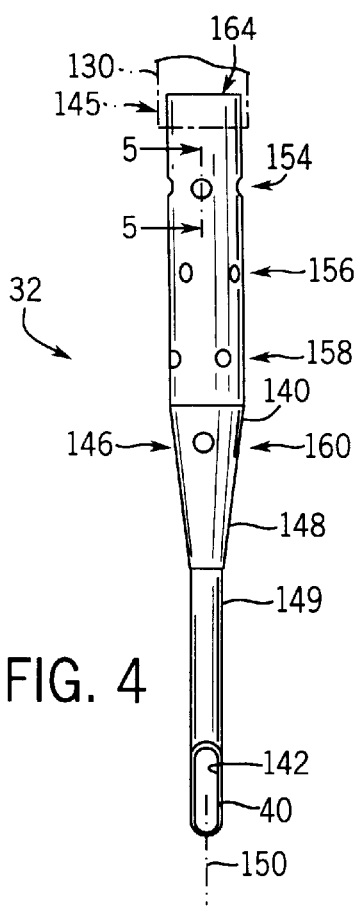
FIG. 4 is an end view of the material placement tube of FIG. 3 taken along lines 4—4.
Figure 5:
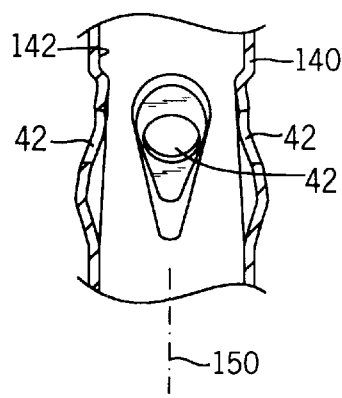
FIG. 5 is a sectional view of the material placement tube of FIG. 4 taken along lines 5—5.

FIGS. 4 and 5 illustrate material placement tube 32 in greater detail. FIG. 4 is an end view of tube 32 taken along lines 4—4 of FIG. 3. FIG. 5 is a sectional view of tube 32 taken along lines 5—5 of FIG. 4. As best shown by FIG. 4, material placement tube 32 includes an elongate unitary outer wall 140 which defines an interior passage 142. Passage 142 communicates with the interior passage of material delivery tube 130 and includes an upper portion 145 and a lower constricted portion 146. Upper portion 145 connects to material delivery tube 130 and tapers to narrow constricted portion 146. As shown by FIG. 4, lower constricted portion 146 includes tapered portion 148 and knife portion 149. Tapered portion 148 extends generally in the shape of a funnel. Knife portion 149 is oblong and narrow such that outlet 40 is shaped as an elongate oval. As a result, material placement tube 32 better deposits particulate material within a relatively narrow furrow 16 formed by furrow opening device 20. As further shown by FIG. 4, material placement tube 32 and passage 142 generally extend along a linear axis 150. As a result, tube 32 is easy to manufacture and easy to correctly position adjacent to furrow opening device 120.

As best shown by FIG. 5, each opening 42 is preferably louvered so as to extend downwardly at an angle towards outlet 40 and towards axis 150. In the exemplary embodiment each opening 42 extends downwardly at an angle of between about 50 degrees and about 20 degrees with respect to axis 150. Because openings 42 are louvered, particulate material and particulate material dust is less likely to escape through openings 42. Moreover, excess air pressure within interior passage 142 is more easily diffused through openings 42. In the exemplary embodiment, openings 42 are formed by radially drilling through outer wall 140 and by materially deforming outer wall 140 about opening 42 such that openings 42 are downwardly louvered. As will be appreciated, openings 42 may alternatively be formed of various other methods. For example, openings 42 may be formed by cutting or boring through wall 140, by puncturing wall 140 or by otherwise cutting wall 140. Moreover, openings 42 may be formed during the molding or casting process used to form wall 140 in tube 32.

In the exemplary embodiment, the number, size and location of openings 42 are selected such that air velocity within upper portion 145 is between about 1 to about 1.3 times that of air velocity in lower constricted portion 146 adjacent to outlet 40. As a result, the velocity of the particulate material carried by the air flow passing through interior passage 142 is reduced prior to reaching outlet 40 so as to prevent the particulate material from bouncing out of the furrow. The size or diameter of openings 42 depend upon the particulate material being delivered by system 12. Because openings 42 are louvered, openings 42 may have a maximum dimension actually greater than the minimum dimension of the particulate material being delivered through tube 32. As a result, excess air pressure within interior passage 142 is more easily diffused through openings 42.

In the exemplary embodiment, tube 32 is formed from steel and has an overall length of approximately 394 millimeters. Tapered portion 148 has a length of approximately 36 millimeters. Knife portion 149 has a length of approximately 146 millimeters. Each of openings 42 has a diameter of approximately 10 millimeters. Openings 42 extend about axis 150 along four spaced-apart rows 154, 156, 158 and 160. Each of rows 154, 156, 158 and 160 includes four equidistantly spaced openings 42 about axis 150. The relative locations of openings 42 of row 154 are offset by approximately 45 degrees with respect to openings 42 of row 156. Openings 42 of rows 156, 158 and 160 are similarly offset from one another. Row 154 of openings 42 is spaced from end 164 by approximately 51 millimeters. Rows 154, 156, 158 and 160 are spaced apart from one another by approximately 45 millimeters. Upper portion 145 has a diameter of approximately 38 millimeters while outlet 40 has a width of approximately 17 millimeters and a transverse unangled length of approximately 50 millimeters. Wall 140 has a thickness of approximately 3 millimeters. As will be appreciated, the exact dimensions of tube 32 and openings 42 will vary depending upon the type and amount of particulate material being delivered by system 12. Because openings 42 are uniformly distributed about axis 150 and about interior passage 142, openings 42 provide for a uniform diffusion of air from interior passage 142 to prevent excessive back pressure.

Pneumatic agricultural participate material delivery system 12 illustrated in FIGS. 1–5 includes multiple independent features. For example, such independent features include: (1) forming openings 42 in an end-most tube, (2) locating openings 42 proximate to furrow opening device 20 and preferably below the upper circumferential edge of furrow opening device 20, and (3) louvering openings 42 such that openings 42 angle downwardly towards outlet 40 and towards axis 150. Although such features are optimally used together, each of such features may be employed as part of a pneumatic agricultural material delivery system independent of one another. For example, louvered openings 42 may be employed by a diffuser tube spliced between tubes. Furthermore, an end-most tube may be provided with openings which are not louvered. For example, non-louvered openings 42 may provided in an intermediate tube proximate to a furrow opening device and preferably below the upper circumferential edge of a furrow opening disk. Although viewed as less optimal, each of such alternatives are contemplated within the scope of the present disclosure.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A material placement tube for use with a pneumatic agricultural particulate material delivery system, the material placement tube comprising:

an elongate unitary outer wall providing an interior passage terminating at an outlet, the passage having an upper portion and a lower constricted portion between the upper portion and the outlet;

a plurality of louvered openings extending through the outer wall in communication with the interior passage; and wherein the plurality of openings are sized and located such that air velocity within the upper portion is between about 1 to about 1.3 times that of an air velocity in the lower constricted portion.

2. A material placement tube for use with a pneumatic agricultural particulate material delivery system, the material placement tube comprising:

an elongate unitary outer wall providing an interior passage terminating at an outlet, the passage having an upper portion and a lower constricted portion between the upper portion and the outlet;

a plurality of louvered openings extending through the outer wall in communication with the interior passage; and wherein the plurality of openings are spaced about the passage and along the passage.

3. A material placement tube for use with a pneumatic agricultural particulate material delivery system, the material placement tube comprising:

an elongate unitary outer wall providing an interior passage terminating at an outlet, the passage having an upper portion and a lower constricted portion between the upper portion and the outlet;

a plurality of louvered openings extending through the outer wall in communication with the interior passage;

wherein the lower constricted portion includes a knife portion; and wherein the knife portion has an elongated oval cross-sectional shape.

* * * * *